Jan. 14, 1958 F. J. H. CHARMAN 2,820,220
SLOT AERIALS
Filed Dec. 7, 1954

Inventor
F. J. H. Charman
By: Glascock Downing & Seebold
Attys.

2,820,220

SLOT AERIALS

Frederick John Henry Charman, Stoke Poges, England, assignor to Electric & Musical Industries Limited, Hayes, Middlesex, England, a company of Great Britain Application December 7, 1954, Serial No. 473,580

Claims priority, application Great Britain December 9, 1953

8 Claims. (Cl. 343—749)

This invention relates to slot aerials.

Slot aerials usually comprise a flat plate or tubular conductor formed with a slot therein which serves for the reception or transmission of high frequency radiation. These slot aerials are tuned aerials and the length of the slot determines, in general, the resonant frequency of the aerial. For very high frequencies the length of the slot becomes small and in order to obtain good directivity and substantial gain it is often necessary to employ an array of such aerials.

The object of the present invention is to provide an improved slot aerial in which the directivity and gain can be increased.

According to the present invention a resonant slot aerial is provided having effective shunt inductive elements disposed at discrete intervals along its length so that the phase velocity of the wave set up in said aerial is increased beyond the free space velocity of electromagnetic propagation. Thus, in the case of a half wavelength aerial the physical length of the slot is increased beyond that necessary for the aerial to be resonant as a free space half wavelength aerial. The aerial may be provided with shunt inductive elements disposed at intervals along its length, as for example at 30° intervals or less, with the result that the phase velocity of the current in the aerial will be increased and the voltage distribution along the aerial is thus extended depending on the nature of the inductive elements introduced.

Figure 1:
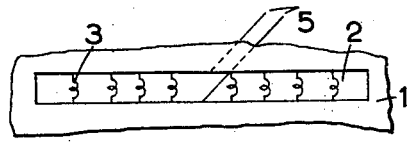
Figure 2:
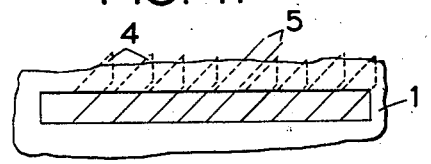

In order that the said invention may be clearly understood and readily carried into effect, it will now be more fully described with reference to the accompanying drawings, in which:

Figure 1 illustrates a slot aerial in accordance with one embodiment of the invention, Figure 2 illustrates a slot aerial in accordance with a further embodiment of the invention, and Figures 3, 4, 5 and 6 illustrate respectively slot aerials in accordance with further embodiments of the invention.

As shown in Figure 1 of the drawings, the reference numeral 1 indicates a portion of a flat plate or tubular conductor which is provided with a slot 2 formed therein for the reception or transmission of high frequency radiation. Normally the physical length of the slot would be chosen so as to be equal to a free space half wavelength of the frequency of radiation which it is intended to be transmitted or received. In accordance with the present invention, the phase velocity of the wave set up in the aerial is increased by providing along the length of the aerial shunt inductive elements which, in the embodiment shown in Figure 1, comprise coils 3 bridging the longitudinal edges of the slot 2. These shunt inductive elements may be arranged, for example, at 30° intervals or less and as a result of the introduction of these shunt inductive elements the physical length of the slot can be increased to an extent substantially greater than the length of the slot which would normally be required for the aerial to be resonant as a free space half wavelength aerial. In some cases there may be as many as eighteen shunt reactances along the length of the slot. The polar diagram of such an aerial is similar to that of three slot aerials arranged in line and in phase with one another.

In Figure 2 of the drawings, instead of the slot being provided with inductances in the form of coils so-called stubs indicated at 4 are employed.

It will be appreciated that between the edges of the slot 2 there exists a shunt capacitative reactance but by providing the shunt inductive loading in accordance with the invention, the shunt capacitative reactance can be largely tuned-out thereby increasing the phase velocity of the wave set up in the aerial beyond the free space velocity of electro-magnetic propagation, thus enabling the physical length of the slot to be increased. If $n$ is the ratio in which the length of the slot is required to be extended then the inductive reactance $X$ required for the shunt inductive loading is:

$$X = j\frac{n}{n-1} Z \cot \varphi$$

where $$Z = \frac{30 \pi^2}{\log \left(\frac{8L}{w} - 1\right)}$$

where $2L$ is the length of the slot, $w$ is the width of the slot and $\varphi$ is the free space angular spacing of the loading along the slot. In one specific example of an aerial constructed in accordance with the embodiment shown in Figure 2 of the drawings for use at 3,200 megacycles per second, $n=3$, the length of the slot 5½″ with a chosen width of ¼″. In this example $Z=72$ ohms and $\varphi$ chosen to be 30°, which resulted in a loading reactance $X$ of 190 ohms. Such reactance is provided by 18 short-circuited sections of balanced transmission line of 110 ohms characteristic impedance and each having a length of ⅝″.

Figure 3:
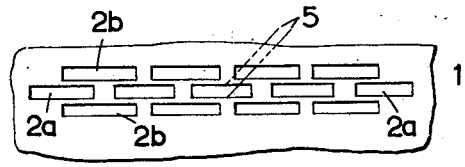
Figure 4:
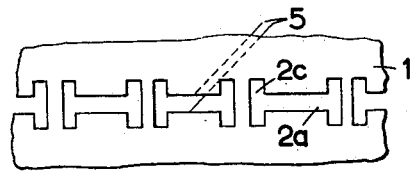

A further embodiment of the invention is shown in Figure 3 of the drawings in which the inductive reactances are introduced by short-circuiting the slot at intervals along the length thereof and by providing additional elements adjacent the short circuits in order to reduce the effect of the short circuits so as to make them appear inductive. In Figure 3 the short circuits are provided by dividing the slot into a number of shorter slots indicated at 2a and overlapping the adjacent ends of the slots 2a by a plurality of additional slots 2b, these slots 2b serving to reduce the effect of the short circuits so that the latter appear inductive. A similar effect can be obtained as shown in the embodiment illustrated in Figure 4 of the drawings in which the shorter slots 2a are provided at their adjacent ends with transversely slotted portions 2c which effectively lengthens the short circuit and so makes it appear inductive at the frequencies involved. A similar effect can be obtained with the embodiment shown in Figure 5 of the drawings in which the slots 2a are increased in their widths from their centres outwardly.

Figure 5:
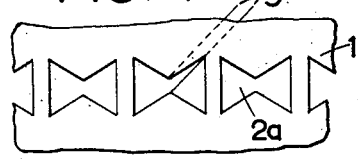

In Figures 1 to 5, a suitable feeder 5 is connected to the mid-point of the aerial shown, although if desired the point to which the feeder 5 is connected may be disposed at some other position of suitable impedance or it may be tapped into one of the shunt reactances or one of the slots 2b or 2c or one of the enlarged ends of one of the slots shown in Figure 5. The amount of shunt inductive loading which is introduced in accordance with the invention may be varied along the length of the aerial in order to produce a desired field distribution along the slot. The loading introduced need not necessarily be a simple inductance since it may be compounded with capacity so as to become effective over more than one frequency range.

Figure 6:
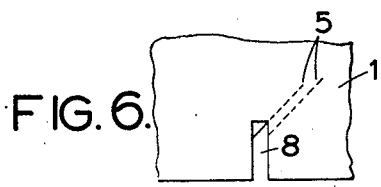

The invention may be applied so as to afford effectively an earthed quarter wavelength aerial as shown in Figure 6. In this construction the conductor 1 is provided with a half slot 8 extending from one edge of the conductor 1 and the feeder 5 is connected to opposite edges of the slot 8 at a point of suitable impedance. Shunt inductances according to any of the examples described above are provided along the length of the slot 8.

What I claim is:

1. A resonant slot aerial having more than two effective shunt inductance elements for each quarter wavelength of said aerial disposed at discrete intervals along its length with the number and magnitudes of the shunt elements chosen to increase the phase velocity of a wave set up in said aerial beyond the free space velocity of electromagnetic propagation.

2. A resonant slot aerial having more than two effective shunt inductance elements for each quarter wavelength of said aerial disposed at discrete intervals along its length with the number and magnitudes of the shunt elements chosen to increase the phase velocity of a wave set up in said aerial beyond the free space velocity of electromagnetic propagation with the length of said slot greater than that required for the aerial to operate as an aerial resonant at a free space quarter wavelength.

3. A resonant slot aerial having more than two effective shunt inductance elements for each quarter wavelength of said aerial disposed at discrete intervals along its length with the number and magnitudes of the shunt elements chosen to increase the phase velocity of electromagnetic propagation with the length of said slot greater than that required for the aerial to operate as an aerial resonant at a free space half wavelength.

4. A resonant slot aerial having more than two effective shunt inductance elements for each quarter wavelength of said aerial disposed at discrete intervals along its length, said inductance elements comprising stubs the ends of which are connected to opposite longitudinal edges of said slot with the number and magnitude of the shunt elements chosen to increase the phase velocity of a wave set up in said aerial beyond the free space velocity of electro-magnetic propagation.

5. A resonant slot aerial provided along its length with a plurality of effective short circuits and means for reducing the effect of said short circuits to make said short circuits appear as inductances and with the number and magnitude of said inductances chosen to increase the phase velocity of a wave set up in said aerial beyond the free space velocity of electro-magnetic propagation.

6. A resonant slot aerial according to claim 5, wherein said means comprises additional slots overlapping said short circuits.

7. A resonant slot aerial provided along its length with a plurality of effective short circuits, said slot adjacent said short circuits being provided with transversely extending portions so as to make said short circuits appear as inductances and with the number of said effective short circuits and the magnitude of said inductances chosen to increase the phase velocity of a wave set up in said aerial beyond the free space velocity of electromagnetic propagation.

8. A resonant slot aerial provided along its length with a plurality of effective short circuits with the width of said slot increasing progressively towards said short circuits to make said short circuits appear as inductances and with the number of effective short circuits and the magnitude of said inductances chosen to increase the phase velocity of a wave set up in said aerial beyond the free space velocity of electro-magnetic propagation.

References Cited in the file of this patent

UNITED STATES PATENTS

| 2,507,528 | Kandoian | May 16, 1950 |
| 2,605,411 | Riblet | July 29, 1952 |
| 2,622,196 | Alford | Dec. 16, 1952 |

FOREIGN PATENTS

| 894,573 | Germany | Oct. 26, 1953 |

OTHER REFERENCES

"Slot Feeder's and Slot Aerials," J. I. E. E. (British), vol. 93, Part III A, No. 4, pages 615–619, 1946.